(12) United States Patent
Hwang (10) Patent No.: US 6,895,114 B2
(45) Date of Patent: May 17, 2005

(54) METHOD AND APPARATUS FOR MODIFYING PAGE DATA

(75) Inventor: Euiseok Hwang, Seoul (KR)

(73) Assignee: Daewoo Electronics Co., Ltd. (KR)

( * ) Notice: Subject to any disclaimer, the term of this patent is extended or adjusted under 35 U.S.C. 154(b) by 640 days.

(21) Appl. No.: 10/038,345

(22) Filed: Jan. 3, 2002

(65) Prior Publication Data

US 2003/0043150 A1 Mar. 6, 2003

(30) Foreign Application Priority Data

Aug. 29, 2001 (KR) .......................... 2001-52319

(51) Int. Cl.[7] .............................. G06K 9/34; G02B 5/32
(52) U.S. Cl. ..................................... 382/173; 359/15
(58) Field of Search .................. 382/164, 171, 382/173, 175, 180, 284, 305; 359/9, 11, 15, 24, 25, 35; 365/125, 215, 216

(56) References Cited

U.S. PATENT DOCUMENTS

| | | | | |
|---|---|---|---|---|
| 4,094,011 A | * | 6/1978 | Nagao | 365/216 |
| 4,278,318 A | * | 7/1981 | Nakayama et al. | 359/25 |
| 5,347,375 A | * | 9/1994 | Saito et al. | 359/9 |
| 5,519,651 A | * | 5/1996 | Redfield | 365/125 |
| 5,627,664 A | * | 5/1997 | Trisnadi | 359/11 |
| 5,668,648 A | * | 9/1997 | Saito et al. | 359/9 |
| 5,687,343 A | * | 11/1997 | Fecteau et al. | 711/202 |
| 5,777,760 A | | 7/1998 | Hays et al. | 359/7 |
| 6,064,586 A | * | 5/2000 | Snyder et al. | 365/125 |
| 6,414,763 B1 | * | 7/2002 | Hesselink et al. | 359/21 |
| 6,594,030 B1 | * | 7/2003 | Ahlstrom et al. | 358/1.15 |
| 6,661,725 B2 | * | 12/2003 | Roh | 365/216 |

FOREIGN PATENT DOCUMENTS

GB 2332754 6/1999 .......... G11C/13/00

* cited by examiner

Primary Examiner—Andrew W. Johns
Assistant Examiner—Amir Alavi
(74) Attorney, Agent, or Firm—Anderson Kill & Olick, PC (57) ABSTRACT

A method and apparatus for modifying rectangular page data to be recorded in a holographic digital storage system may be used to reduce information loss due to image distortion. After each rectangular page data is divided into a central region and a peripheral region, only the peripheral region is rearranged to generate a rearranged peripheral region. The central region is merged with the rearranged peripheral region to generate modified page data which has a shape of circle or n-polygon, n being an integer equal to or larger than 5.

10 Claims, 7 Drawing Sheets

METHOD AND APPARATUS FOR MODIFYING PAGE DATA

FIELD OF THE INVENTION

The present invention relates to a holographic digital data storage system; and, more particularly, to a method and apparatus for modifying page data to be recorded in the holographic digital storage system which is capable of reducing information loss due to image distortion in the holographic digital data storage system.

BACKGROUND OF THE INVENTION

As is well known, demands for an optical storage system that can store a large amount of data, such as data for a motion picture film, have been increasing. Therefore, various types of holographic digital data storage system incorporating therein a storage medium have been recently developed for realizing high density optical storage capabilities.

The holographic digital data storage system allows a signal beam having information therein to interfere with a reference beam to generate an interference pattern therebetween and, then, controls the interference pattern to be stored in the storage medium such as an optical refractive crystal, wherein the optical refractive crystal is a material which may react differently depending on an amplitude and a phase of the interference pattern. In case the incident angle, the amplitude or the phase of the reference beam is changed, hundreds or thousands of binary data may be superposedly recorded at one location on a page basis.

Figure 1:
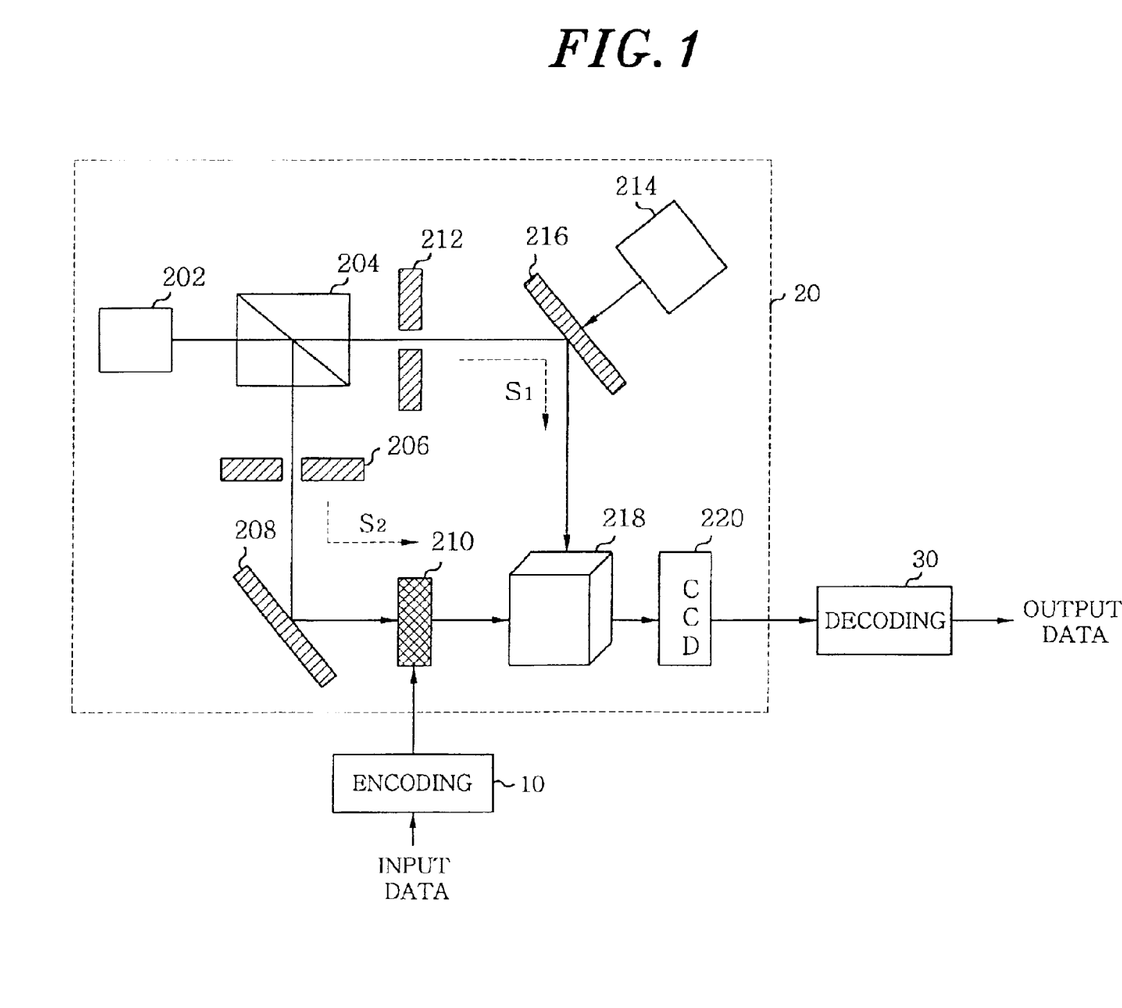
FIG. 1 represents a block diagram for illustrating a conventional holographic digital data storage system.

Referring to FIG. 1, there is shown a conventional holographic digital data storage system, wherein the conventional system comprises an encoding circuit 10, a recoding and reconstructing circuit 20 and a decoding circuit 30.

The encoding circuit 10 encodes input data to generate rectangular page data to be provided to the recording and reconstruction circuit 20, wherein the rectangular page data has an l×m pixel array, l and m being positive integers, respectively, and each pixel has a binary value to represent a pixel brightness.

The recoding and reconstruction circuit 20 has a laser 202, a beam splitter 204, a first and a second shutter 206 and 212, a first and a second mirror 208 and 216, an actuator 214, a spatial light modulator(SLM) 210, a storage medium 218 and a charge coupled device(CCD) 220. In the recording and reconstruction circuit 20, a laser beam emitted from the laser 202 has generally a shape of circle and impinges onto the beam splitter 204 which is capable of partially reflecting the laser beam to thereby obtain a reference and a signal beam, wherein the reference beam is a portion of the laser beam transmitted through the beam splitter 204 and the signal beam is a remaining portion of the laser beam reflected from the beam splitter 204. The reference beam enters into the storage medium 218 through a reference beam path (S1) after being reflected by the first mirror 216 controlled by the actuator 214. In the meantime, the signal beam enters into the SLM 210 which converts the signal beam impinged thereonto into a modulated signal beam through a signal beam path (S2) after being reflected by the second mirror 208, wherein the modulated signal beam carries data in the form of pages after passing through the SLM 210.

The modulated signal beam is focused on the storage medium 218. In the storage medium 218, the modulated signal beam interferes with the reference beam to thereby generate an interference pattern therebetween, wherein the interference pattern contains information on the modulated signal beam, i.e., information on the rectangular page data itself. The interference pattern is converted into an optical index pattern in the storage medium 218 whose refractive index changes in response to the interference pattern to thereby record the modulated signal beam into the storage medium 218.

To read the modulated signal beam recorded in the storage medium 218, only the first shutter 212 remains open while the second shutter 206 turns to be closed so that the reference signal may be introduced to the storage medium 218 as a reconstruction reference beam. If the reconstruction reference beam is introduced into the storage medium 218, a retrieved signal beam corresponding to the optical index pattern may be generated from the storage medium 218, wherein the retrieved signal beam is generated by diffraction of the reconstruction reference beam from the storage medium 218. The retrieved signal beam enters the CCD 220 which is capable of detecting the power of the retrieved signal beam to reconstruct the rectangular modulated page data. The reconstructed rectangular modulated page data is transmitted to the decoding circuit 30.

The decoding circuit 30 decodes the reconstructed rectangular modulated page data to generate output data.

In general, the rectangular page data have been used to modulate the signal beam so that the modulated signal beam may have a shape of rectangle which is equal to that of a displaying device. However, a Gaussian distribution of a circular laser beam and the lens deformation cause the rectangular page data to be deformed in proportion to a distance from the center of each page. Accordingly, the peripheral region of the rectangular page data may have been considerably damaged and, especially, the 4 edges of the rectangular page data may have been seriously defected.

SUMMARY OF THE INVENTION

It is, therefore, an object of the present invention to provide a method and apparatus for modifying rectangular page data to be recorded in the holographic digital storage system capable of reducing information loss due to image distortion in the holographic digital data storage system.

In accordance with an aspect of the invention, there is provided a method for modifying rectangular page data to be recorded in a holographic digital data storage system, comprising the steps of:

(a) dividing the rectangular page data into a central region thereof and a peripheral region which surrounds the central region;

(b) rearranging the peripheral region to generate a rearranged peripheral region; and (c) merging the central region with the rearranged peripheral region to generate a modified page data.

In accordance with another aspect of the invention, there is provided an apparatus for modifying rectangular page data to be recorded in a holographic digital data storage system, comprising:

means for dividing the rectangular page data into a central region thereof and a peripheral region which surrounds the central region;

means for rearranging the peripheral region to generate a rearranged peripheral region; and means for merging the central region with the rearranged peripheral region to generate a modified page data.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 2:
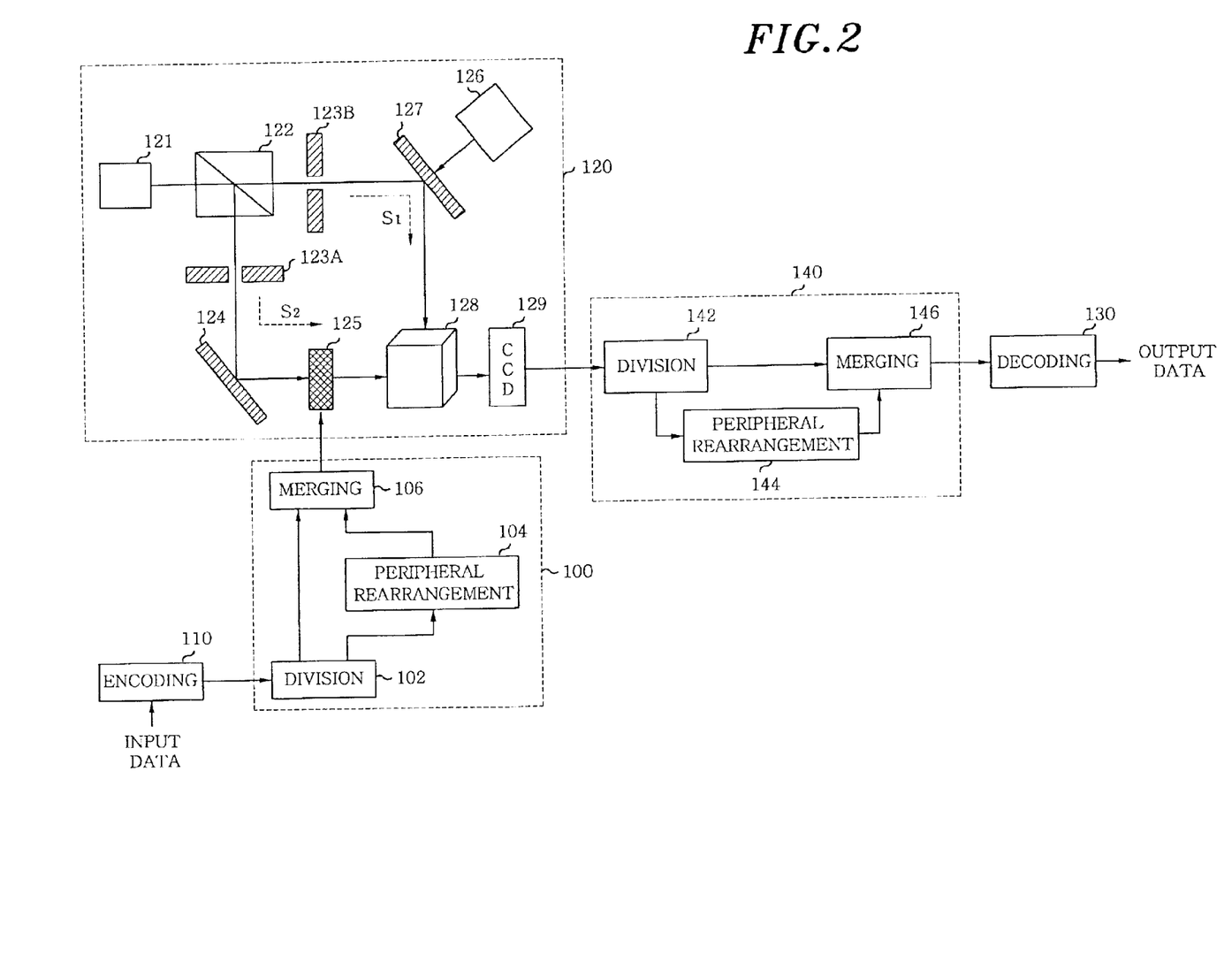
FIG. 2 shows a block diagram for illustrating a holographic digital data storage system in accordance with the present invention.

Referring to FIG. 2, there is shown a block diagram for illustrating a holographic digital data storage system in accordance with a preferred embodiment of the present invention, wherein the system comprises an encoding circuit 110, an input modification circuit 100, a recoding and reconstructing circuit 120, an output modification circuit 140 and a decoding circuit 130.

The encoding circuit 110 encodes input data to generate rectangular page data and provides them to the input modification circuit 100, wherein the rectangular page data has an l×m pixel array, 1 and m being positive integers, respectively, and each pixel has a binary value to represent a pixel brightness.

The input modification circuit 100 has an input division unit 102, an input peripheral rearrangement unit 104 and an input merging unit 106.

The input division unit 102 divides the rectangular page data into a central region and a peripheral region. The central region has the center of the rectangular page data and is preferably a rectangle smaller than the dimension of the rectangular page data. The peripheral region surrounds the central region within the rectangular page data.

The input peripheral rearrangement unit 104 rearranges the peripheral region depending on a predetermined modification pattern to generate a rearranged peripheral region. The modification pattern is preferably a circle or an n-polygon, n being a positive integer equal to or larger than 5, so that the 4 edges of the rectangular page data may be dislocated.

The input merging unit 106 merges the central region with the rearranged peripheral region to generate modified page data. While the rectangular page data generally have the shape of a rectangle, the modified page data has a shape of circle or n-polygon in accordance with the present invention.

The recoding and reconstruction circuit 120 has a laser 121, a beam splitter 122, a first and a second shutter 123A and 123B, a first and a second mirror 124 and 127, an actuator 126, a spatial light modulator (SLM) 125, a storage medium 128 and a charge coupled device (CCD) 129. In the recording and reconstruction circuit 120, a laser beam emitted from the laser 121 has generally a shape of circle and impinges onto the beam splitter 122 which is capable of partially reflecting the laser beam to thereby obtain a reference and a signal beam, wherein the reference beam is a portion of the laser beam transmitted through the beam splitter 122 and the signal beam is a remaining portion of the laser beam reflected from the beam splitter 122.

The reference beam enters into the storage medium 128 through a reference beam path (S1) after being reflected by the first mirror 127 which is controlled by the actuator 126. In the meantime, after being reflected by the second mirror 124, the signal beam enters through a signal beam path (S2) into the SLM 125 which converts the signal beam impinged thereonto into a modulated signal beam, wherein the modulated signal beam carries data in the form of pages after passing through the SLM 125. In other words, on behalf of the rectangular page data of the encoding circuit 110, the modified page data transmitted from the input modification circuit 100 are used at the SLM 125 to modulate the signal beam as the modulated signal beam in accordance with the present invention.

The modulated signal beam is focused on the storage medium 128. In the storage medium 128, the modulated signal beam interferes with the reference beam to thereby generate an interference pattern therebetween, wherein the interference pattern contains information on the modulated signal beam, i.e., information on the modified page data. The interference pattern is converted into an optical index pattern in the storage medium 128 whose refractive index changes in response to the interference pattern to thereby record the modulated signal beam into the storage medium 128.

To read the modulated signal beam recorded in the storage medium 128, only the first shutter 123B remains open while the second shutter 123A turns to be closed so that the reference signal may be introduced to the storage medium 128 as a reconstruction reference beam. If the reconstruction reference beam is introduced into the storage medium 128, a retrieved signal beam corresponding to the optical index pattern may be generated from the storage medium 128, wherein the retrieved signal beam is generated by diffraction of the reconstruction reference beam from the storage medium 128. The retrieved signal beam enters the CCD 129 which is capable of detecting the power of the retrieved signal beam to reconstruct the modulated page data. The reconstructed modulated page data is transmitted to the output modification circuit 140.

The output modification circuit 140 has an output division unit 142, an output rearrangement unit 144 and an output merging unit 146.

The output division unit 142 divides the reconstructed modulated page data into a central modulated region and a peripheral modulated region. The output rearrangement unit 144 rearranges the peripheral modulated region to generate a rearranged peripheral modulated region. The output merging unit 146 merges the central modulated region with the rearranged peripheral modulated region to regenerate rectangular modulated page data, wherein the rectangular modulated page data corresponds to the rectangular page data. The rectangular modulated page data are transmitted to the decoding circuit 130.

The decoding circuit 130 decodes the rectangular modulated page data to generate output data.

Figure 3A:
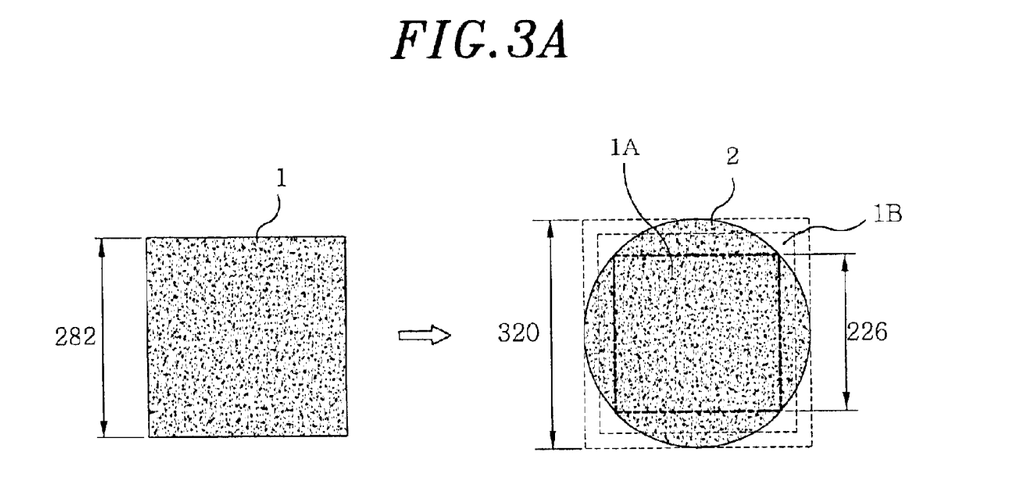
FIGS. 3A and 3B describe two modification patterns for modifying rectangular page data in accordance with the present invention.
Figure 3B:
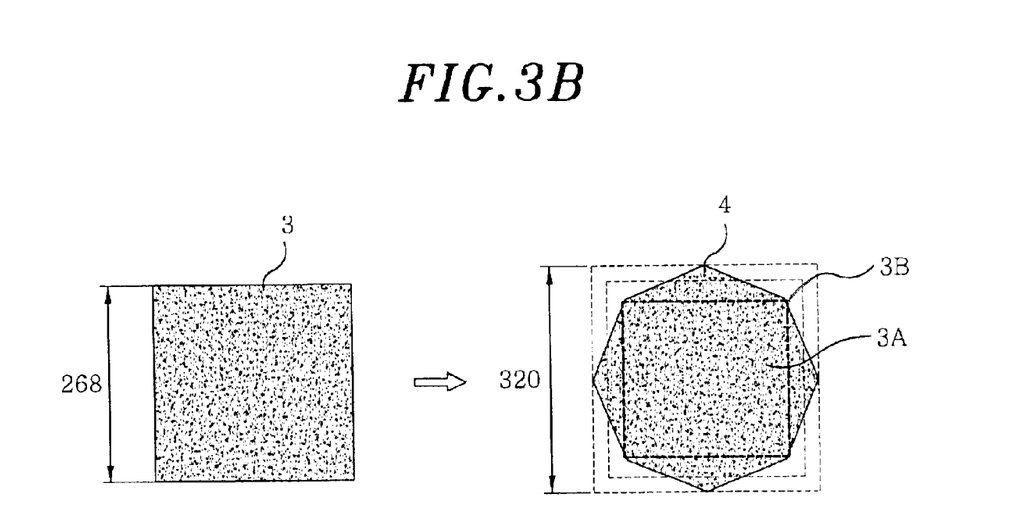

Referring to FIGS. 3A and 3B, there are two modification patterns for modifying rectangular page data in accordance with the present invention.

The rectangular page data 1 with a 282×282 pixel array may be divided into a central region 1A and a peripheral region 1B as shown in FIG. 3A, wherein the central region 1A is a 226×226 pixel array If the peripheral region 1B is rearranged based on a circular modification pattern in accordance with the present invention, the rectangular page data may be modified into circular page data 2 with a diameter of 320 pixels.

The rectangular page data 3 with a 268×268 pixel array may be divided into a central region 3A and a peripheral region 3B as shown in FIG. 3B. If the peripheral region 3B is rearranged in accordance with an octagonal modification pattern, the rectangular page data may be modified into octagonal page data 4 with a maximal diagonal of 320 pixels.

Figure 4:
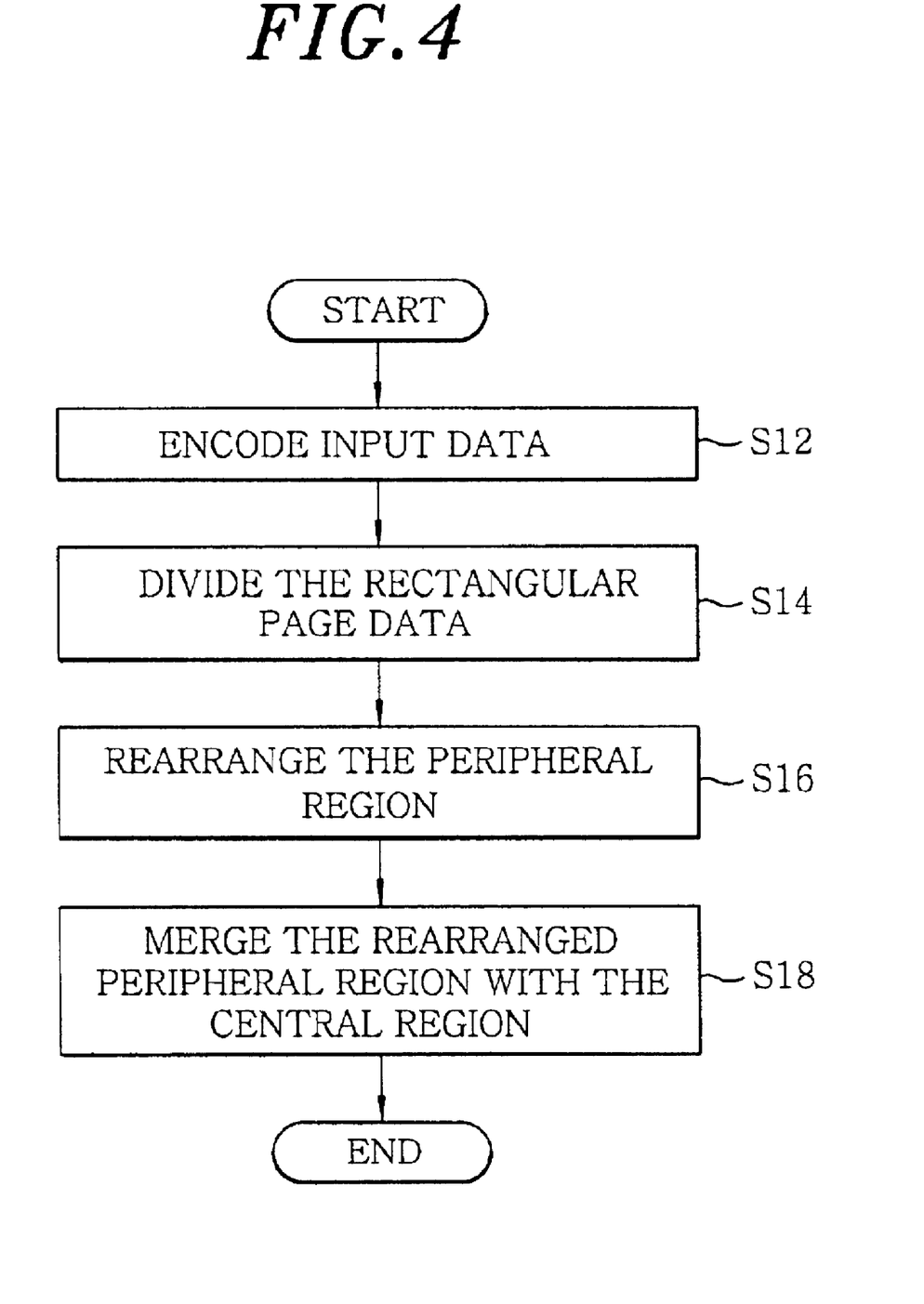
FIG. 4 provides a flow chart for modifying the rectangular page data in accordance with the present invention.

Referring to FIG. 4, there is shown a flow chart for modifying the rectangular page data in accordance with the present invention.

At step S12, if there are received the input data to be encoded, the input data are encoded to generate the rectangular page data.

Figure 5A:
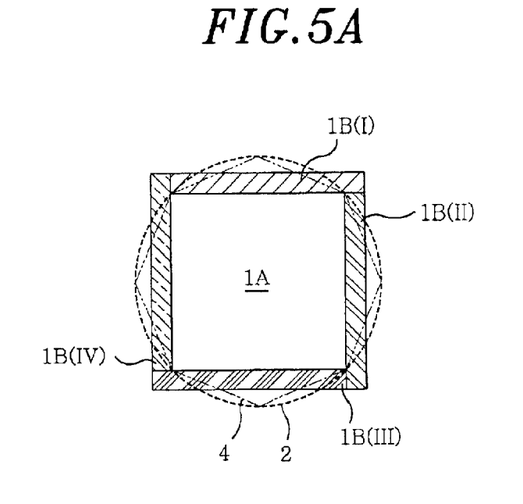
FIG. 5A presents an example of the peripheral region having 4 peripheral rectangles.

At step S14, the rectangular page data are divided into a central region 1A and 4 peripheral regions 1B(I), 1B(II), 1B(III) and 1B(IV) surrounding the central region 1A as shown in FIG. 5A.

Figure 5B:
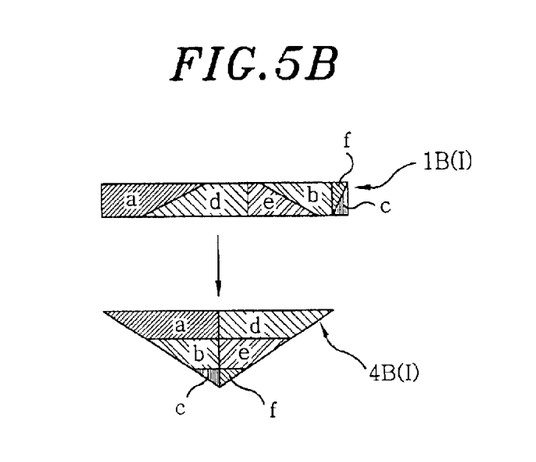
FIGS. 5B and 5C set forth two examples for rearranging each peripheral rectangle to generate a triangular segment and a rounding segment, respectively.
Figure 5C:
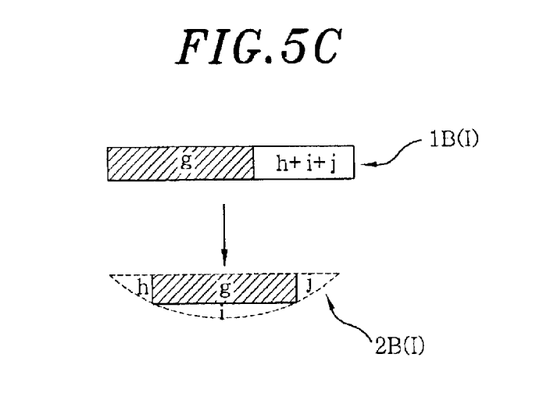

At step S16, the pixel data in the peripheral region 1B are rearranged in accordance with a circular pattern 2 or an octagonal pattern 4 of the present invention. For example, as shown in FIG. 5B, each rectangular peripheral region 1B(I) may be divided into six components a to f, which are rearranged to generate a triangular segment 4B(I) to be attached on a side of the central region 1A. As shown in FIG. 5C, each rectangular peripheral region 1B(1) may be divided into two components g and h+i+j, which are rearranged to generate a rounding segment 2B(I) to be attached on a side of the central region 1A. The triangular segments 4B(I) and the rounding segments 2B(I) are used as the rearranged peripheral region.

At step S18, the rearranged peripheral region is merged with the central region 1A to generate the modified page data. For example, 4 triangular segments 4B(I) and 4 rounding segments 2B(I) are attached on 4 sides of the central region 1A, respectively, to generate circular page data 2 or octagonal page data 4 shown in FIG. 5A.

Figure 6:
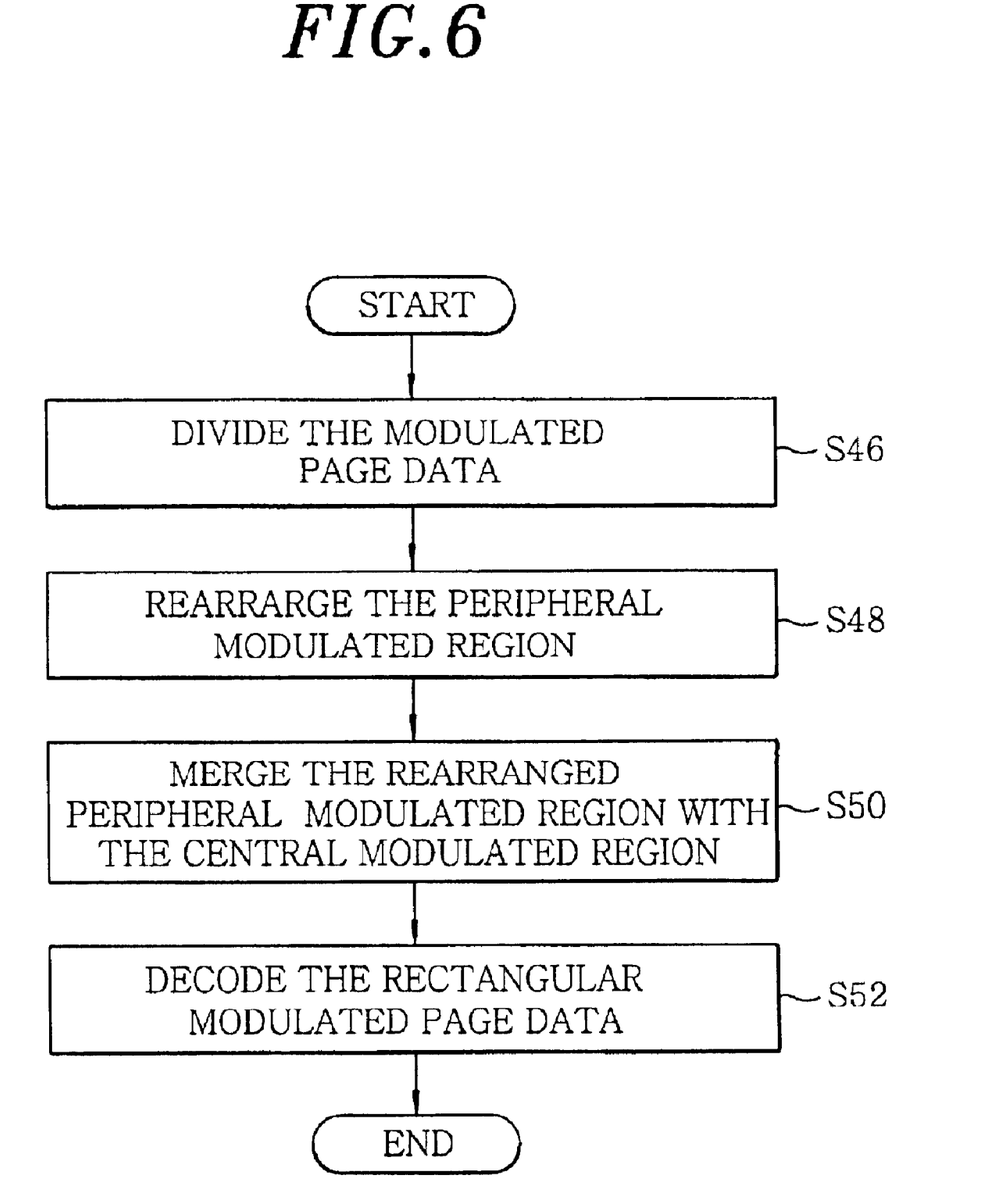
FIG. 6 depicts a flow chart for modifying the modulated page data in accordance with the present invention.

Referring to FIG. 6, there is shown a flow chart for modifying the modulated page data in accordance with the present invention.

Figure 7A:
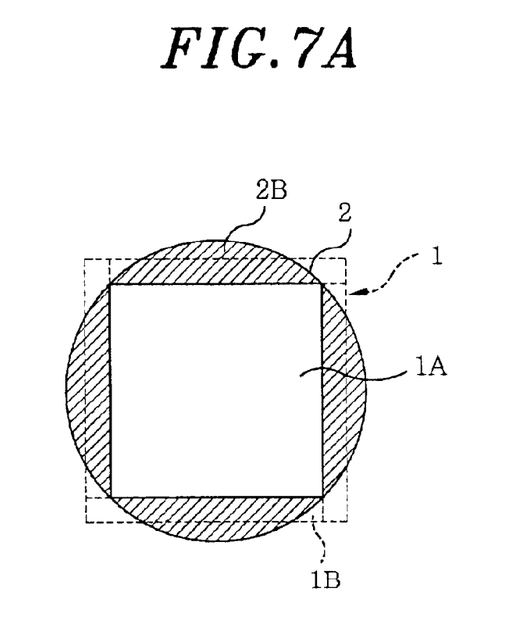
FIG. 7A represents an example of the peripheral modulated page data which has 4 rounding segments.

At step S46, the modulated page data is divided into a central modulated region and a peripheral modulated region. For example, circular modulated page data 2 may be divided into a central modulated region 1A, which is a rectangle, and 4 rounding segments 2B as shown FIG. 7A.

Figure 7B:
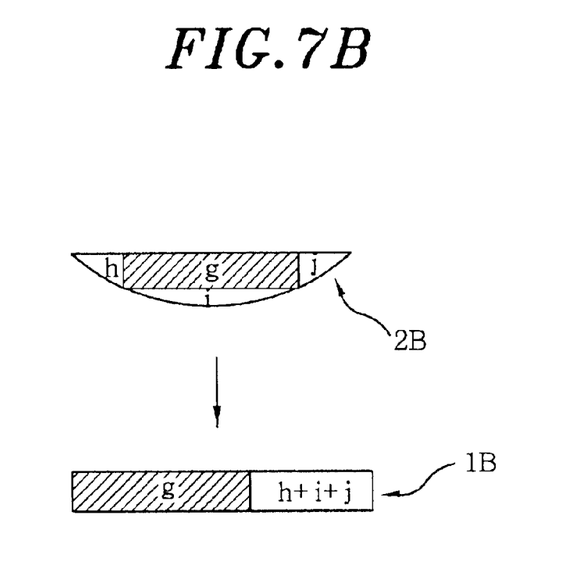
FIG. 7B is an example for rearranging each rounding segment to a rectangle.

At step S48, each peripheral modulated region is rearranged to generate a rearranged peripheral modulated region in accordance with a predetermined inverse modification pattern, wherein the inverse modification pattern has an inverse relation with the modification pattern. For example, each rounding segment 2B shown in FIG. 7B may be rearranged to generate a rectangular peripheral modulated region 1B as the rearranged peripheral modulated region.

At step S50, the rearranged peripheral modulated region 1B is attached to the central modulated region to generate the rectangular modulated page data.

At step S52, the rectangular modulated page data are decoded to generate the output data.

While the invention has been shown and described with respect to the preferred embodiments, it will be understood by those skilled in the art that various changes and modifications may be made without departing from the spirit and scope of the invention as defined in the following claims.

What is claimed is:

1. A method for modifying rectangular page data to be recorded in a holographic digital data storage system, comprising the steps of:
   (a) dividing the rectangular page data into a central region thereof and a peripheral region which surrounds the central region;
   (b) rearranging the peripheral region to generate a rearranged peripheral region; and
   (c) merging the central region with the rearranged peripheral region to generate modified page data.

2. The method of claim 1, wherein the modified page data has a shape of circle.

3. The method of claim 1, wherein the modified page data has a shape of n-polygon, n being an integer equal to or larger than 5.

4. The method of claim 1, further comprising the step of
   (d) saving the modified page data in a storage medium as modulated page data.

5. The method of claim 4, further comprising the steps of:
   (e) reading the modulated page data from the storage medium;
   (f) dividing the modulated page data into central modulated page data thereof and peripheral modulated page data which surround the central modulated page data;
   (g) rearranging the peripheral modulated page data to generate rearranged peripheral modulated page data; and
   (h) merging the central modulated page data with the rearranged peripheral modulated page data to generate rectangular modulated page data, wherein the rectangular modulated page data correspond to the rectangular page data.

6. An apparatus for modifying rectangular page data to be recorded in a holographic digital data storage system, comprising:
   means for dividing the rectangular page data into a central region thereof and a peripheral region which surrounds the central region;
   means for rearranging the peripheral region to generate a rearranged peripheral region; and
   means for merging the central region with the rearranged peripheral region to generate modified page data.

7. The apparatus of claim 6, wherein the modified page data has a shape of circle.

8. The apparatus of claim 6, wherein the modified page data has a shape of n-polygon, n being an integer equal to or larger than 5.

9. The apparatus of claim 6, further comprising a storage medium for saving the modified page data therein as modulated page data.

10. The apparatus of claim 9, further comprising:
    means for reading the modulated page data from the storage medium;
    means for dividing the modulated page data into central modulated page data thereof and peripheral modulated page data which surround the central modulated page data;

means for rearranging the peripheral modulated page data to generate rearranged peripheral modulated page data; and means for merging the central modulated page data with the rearranged peripheral modulated page data to generate rectangular modulated page data, wherein the rectangular modulated page data correspond to the rectangular page data.

* * * * *